United States Patent [19]
Shimizu

[11] Patent Number: 5,615,655
[45] Date of Patent: Apr. 1, 1997

[54] CONTROL SYSTEM FOR INTERNAL COMBUSTION ENGINES

[75] Inventor: Motohiro Shimizu, Wako, Japan

[73] Assignee: Honda Giken Kogyo K.K., Tokyo, Japan

[21] Appl. No.: 495,754

[22] Filed: Jun. 26, 1995

[30] Foreign Application Priority Data

Jun. 29, 1994 [JP] Japan .................................. 6-170225
Aug. 1, 1994 [JP] Japan .................................. 6-199026

[51] Int. Cl.$^6$ .............................. F02P 5/15; F02D 41/14
[52] U.S. Cl. ...................... 123/419; 123/344; 123/436; 123/527
[58] Field of Search ........................ 123/344, 419, 123/436, 527, 418

[56] References Cited

U.S. PATENT DOCUMENTS

| | | | |
|---|---|---|---|
| 4,499,872 | 2/1985 | Ward et al. | 123/344 |
| 4,502,442 | 3/1985 | Takakuwa et al. | 123/436 |
| 4,559,915 | 12/1985 | Naganawa et al. | 123/406 |
| 4,858,583 | 8/1989 | Sonntag | 123/527 |
| 5,012,781 | 5/1991 | Yokyama et al. | 123/353 |
| 5,211,148 | 5/1993 | Furuya et al. | 123/419 |
| 5,278,762 | 1/1994 | Kawamura | 123/419 |
| 5,355,855 | 10/1994 | Saikalis | 123/527 |
| 5,437,253 | 8/1995 | Huffmaster et al. | 123/419 |
| 5,493,901 | 2/1996 | Kuroda et al. | 123/419 |

FOREIGN PATENT DOCUMENTS

| | | | |
|---|---|---|---|
| 0164558 | 12/1985 | European Pat. Off. | |
| 43035 | 4/1977 | Japan | 123/344 |
| 2-23258 | 1/1990 | Japan | |

*Primary Examiner*—Willis R. Wolfe
*Attorney, Agent, or Firm*—Arthur L. Lessler

[57] ABSTRACT

A control system for an internal combustion engine having a pressurized gaseous fuel source, a control valve for regulating the amount of gaseous fuel supplied from the pressurized gaseous fuel source, and an intake passage in which the gaseous fuel, the amount of which has been regulated by the control valve, is mixed with intake air and supplied to the engine as an air-fuel mixture. An ECU of the control system controls the air-fuel ratio of the air-fuel mixture to be supplied to the engine by regulating the amount of the gaseous fuel through the control valve, and various sensors detect operating conditions of the engine. The ignition timing of the engine is calculated based on the detected operating conditions, and when the air-fuel ratio of the air-fuel mixture is in a predetermined lean limit region, the output of the engine is controlled by correcting the ignition timing.

6 Claims, 9 Drawing Sheets

FIG.4A  CRANK ANGLE SPEED

FIG.4B  IGNITION PULSE SIGNAL

FIG.4C  SAMPLING TIMING OF CRANK ANGLE SPEED

FIG.4D  HELD VALUE OF CRANK ANGLE SPEED

| | NE00 | ............ | NE19 |
|---|---|---|---|
| λ00 | θIGY(00,00) | ............ | θIGY(00,19) |
| ⋮ | ⋮ | | ⋮ |
| λ16 | θIGY(16,00) | ............ | θIGY(16,19) |

CONTROL SYSTEM FOR INTERNAL COMBUSTION ENGINES

BACKGROUND OF THE INVENTION

1. Field of the Invention

This invention relates to a control system for internal combustion engines, especially-gas engines which employ a pressurized gaseous fuel, such as LPG (liquefied propane gas) and LBG (liquefied butane gas), as fuel, and more particularly to a control system of this kind, which controls the operation of the engine so as to maintain almost constant speed operation.

2. Prior Art

There are widely known gas engines which are constructed such that a pressurized gaseous fuel such as LPG and LBG from a pressurized gaseous fuel source is supplied via a pressure regulator called "zero governor" to the engine for combustion in the combustion chamber.

In the conventional gas engines, the pressurized gaseous fuel from the pressurized gas source is decompressed to atmospheric pressure by the pressure regulator, and the thus decompressed gaseous fuel is supplied to the engine due to vacuum developed in the engine. More specifically, in the conventional gas engines a throttle valve is provided in the intake pipe as a component of a control system of the engine so that an amount of intake air is controlled thereby, and an amount of gaseous fuel commensurate with the thus controlled amount of intake air is supplied to the engine. However, the intake pipe and the throttle valve have to be arranged under some space limitations imposed by the layout of the engine, resulting in a difficulty in miniaturization of the engine and its control system. In addition, the provision of the throttle valve requires the use of a wire link for controlling the throttle valve, making it difficult to design the engine control system simple in construction.

To overcome these difficulties, there has been proposed a gas engine, for example, by Japanese Laid-Open Patent Publication (Kokai) No. 2-23258, in which attempts are made to design the engine compact in size and simple in construction by omitting the use of a throttle valve in the intake pipe and controlling the engine output only by controlling the flow rate of a gaseous fuel supplied to the engine.

The proposed gas engine has its output controlled through control of the gaseous fuel amount alone without control of the intake air amount, utilizing a characteristic of a pressurized gaseous fuel, such as LPG and LBG, that it has a wider range of concentration at which the fuel is combustible than that of liquid fuel such as gasoline and light oil. For example, in the case of gasoline the leanest possible air-fuel ratio (lean limit) at which the air-fuel mixture is combustible is approximately 1.2 in terms of excess air ratio $\lambda$, while in the case of LPG it is approximately 1.6 in terms of excess air ratio $\lambda$. Therefore, the engine output can be controlled based only on the amount of fuel over a relatively wide range of load on the engine, without controlling the amount of intake air.

Further, in the above proposed gas engine, a pressure regulator and a control valve are serially arranged in the intake system at locations downstream of a pressurized gaseous fuel source. The pressure regulator regulates the pressure of gaseous fuel supplied from the pressurized gaseous fuel source to a constant value, in order to prevent the amount of the gaseous fuel from largely changing due to a change in the pressure of the gaseous fuel. The control valve controls the flow rate of the thus pressure-regulated gaseous fuel by controlling the passage area of the gaseous fuel, to thereby control the supply amount of gaseous fuel. The thus controlled amount of gaseous fuel is mixed with intake air, and the mixture is supplied to the engine.

According to the above proposed gas engine, the engine output can be controlled until the air-fuel ratio reaches its lean limit value by reducing the amount of gaseous fuel to be supplied. If the air-fuel ratio becomes leaner than the lean limit value, however, the engine can undergo irregular combustion, resulting in misfiring etc. As a result, fluctuations in the engine output in a low output region cause increased vibrations and irregular combustion, leading to increased emission of unburnt gas components such as hydrocarbon (HC) and hence degraded exhaust emission characteristics of the engine. More specifically, as shown in FIG. 1, the above proposed gas engine has an engine output characteristic that the engine output sharply drops when the engine enters an irregular combustion region where the excess air ratio $\lambda$ exceeds, for example, 1.6. In the figure, a point A indicates a lean limit point which is a boundary between the irregular combustion region and a normal combustion region in which the engine operation can be normally controlled based on the gaseous fuel amount.

In other words, the proposed gas engine has the disadvantage that when the air-fuel ratio becomes leaner than the lean limit point A, irregular combustion can frequently occur and the emission amount of unburnt gas components such as HC drastically increases, resulting in heavy degradation of exhaust emission characteristics of the engine.

In the proposed gas engine, even if a catalytic converter is provided in the exhaust system for purifying exhaust gases emitted from the engine, the catalytic converter can easily undergo excessive overheating due to the employed gaseous fuel having high concentration. Further, there is a fear that irregular combustion causes fluctuations in the rotational speed of the engine, which results in generation of vibrations, engine stalling, etc. Therefore, the proposed gas engine has limited applications.

Furthermore, since the pressure regulator is arranged in the intake pipe to regulate the pressure of gaseous fuel, a large space for installing-the pressure regulator which is rather large in size, which makes it difficult to design the engine control system compact in size.

Besides, if the kind of gaseous fuel to be used is changed, e.g. when fuel is changed from LPG to LBG, the heating value of which is different from that of LPG, the maximum passage area of the gaseous fuel has to be changed, necessitating exchange of the control valve per se.

SUMMARY OF THE INVENTION

It is a first object of the invention to provide a control system for eternal combustion engines, especially gas engines, which is adapted to control the air-fuel ratio of an air-fuel mixture supplied to the engine by controlling the supply amount of gaseous fuel without controlling the intake air amount, and which is capable of controlling the engine output over a wide engine output range including a low engine output range.

A second object of the invention is to provide a control system of this kind, which is capable of stably controlling the engine output irrespective of change in the supply gaseous fuel pressure without the use of a pressure regulator, and therefore compact in size and simple in construction.

A third object of the invention is to a control system of this kind, Which is capable of easily coping with change of the kind of gaseous fuel to be used.

According to a first aspect of the invention, there is provided a control system for an internal combustion engine having a pressurized gaseous fuel source, a control valve for regulating an amount of gaseous fuel supplied from the pressurized gaseous fuel source, and an intake passage in which the gaseous fuel, the amount of which has been regulated by the control valve, is mixed with intake air and supplied to the engine as an air-fuel mixture.

The control system according to the first aspect of the invention is characterized by comprising:

air-fuel ratio control means for controlling an air-fuel ratio of the air-fuel mixture to be supplied to the engine by regulating the amount of the gaseous fuel through the control valve;

operating condition-detecting means for detecting operating conditions of the engine;

ignition timing-calculating means for calculating ignition timing of the engine, based on the operating conditions detected by the operating condition-detecting means; and ignition timing-correcting means for controlling output of the engine by correcting the ignition timing of the engine when the air-fuel ratio of the air-fuel mixture is in a predetermined lean limit region.

Preferably, no throttle valve for controlling an amount of intake air is arranged in the intake passage of the engine.

More preferably, the control system includes rotational speed-detecting means forming part of the operating condition-detecting means, for detecting rotational speed of the engine, combustion state-determining means for determining a combustion state of the engine, based on a variation in the rotational speed of the engine detected by the rotational speed-detecting means, and lean limit region-determining means for determining whether or not the air-fuel ratio of the air-fuel mixture is in the predetermined lean limit region, based on the combustion state determined by the combustion state-determining means.

Further preferably, when the air-fuel ratio of the air-fuel mixture is in the predetermined lean limit region, the ignition timing-correcting means decreases the output of the engine by retarding the ignition timing of the engine.

According to a second aspect of the invention, there is provided a control system for an internal combustion engine having a pressurized gaseous fuel source, a fuel supply passage connected to the pressurized gaseous fuel source, a control valve arranged across the fuel supply passage, for regulating an amount of gaseous fuel supplied from the pressurized gaseous fuel source, and an intake passage in which the gaseous fuel, the amount of which has been regulated by the control valve, is mixed with intake air and supplied to the engine as an air-fuel mixture.

The control system according to the second aspect of the invention is characterized by comprising:

a gas nozzle provided in the fuel supply passage at a location downstream of the control valve in a dismountable manner, for injecting gaseous fuel into the intake passage;

the control valve being formed by an electromagnetic valve capable of controlling pressure of the gaseous fuel to be supplied to the engine dependent on an amount of current applied thereto, without depending on the pressure of the gaseous fuel supplied from the pressurized gaseous fuel source.

Advantageously, the electromagnetic valve is an electromagnetic proportional valve.

Preferably, the electromagnetic proportional valve comprises a valve section for regulating an amount of gaseous fuel flowing through the electromagnetic proportional valve, a valve housing in which the valve section is accommodated, energizing means arranged adjacent the valve housing and operatively connected to the valve section, for controlling operation of the valve section, and pressure-regulating means provided in the valve section, for regulating the pressure of the gaseous fuel to be supplied to the engine, based on pressure of the gaseous fuel flowing through the electromagnetic proportional valve.

The above and other objects, features, and advantages of the invention will become more apparent from the ensuing detailed description taken in conjunction with the accompanying drawings.

DETAILED DESCRIPTION

The invention will now be described in detail with reference to the drawings showing embodiments thereof.

Figure 2:
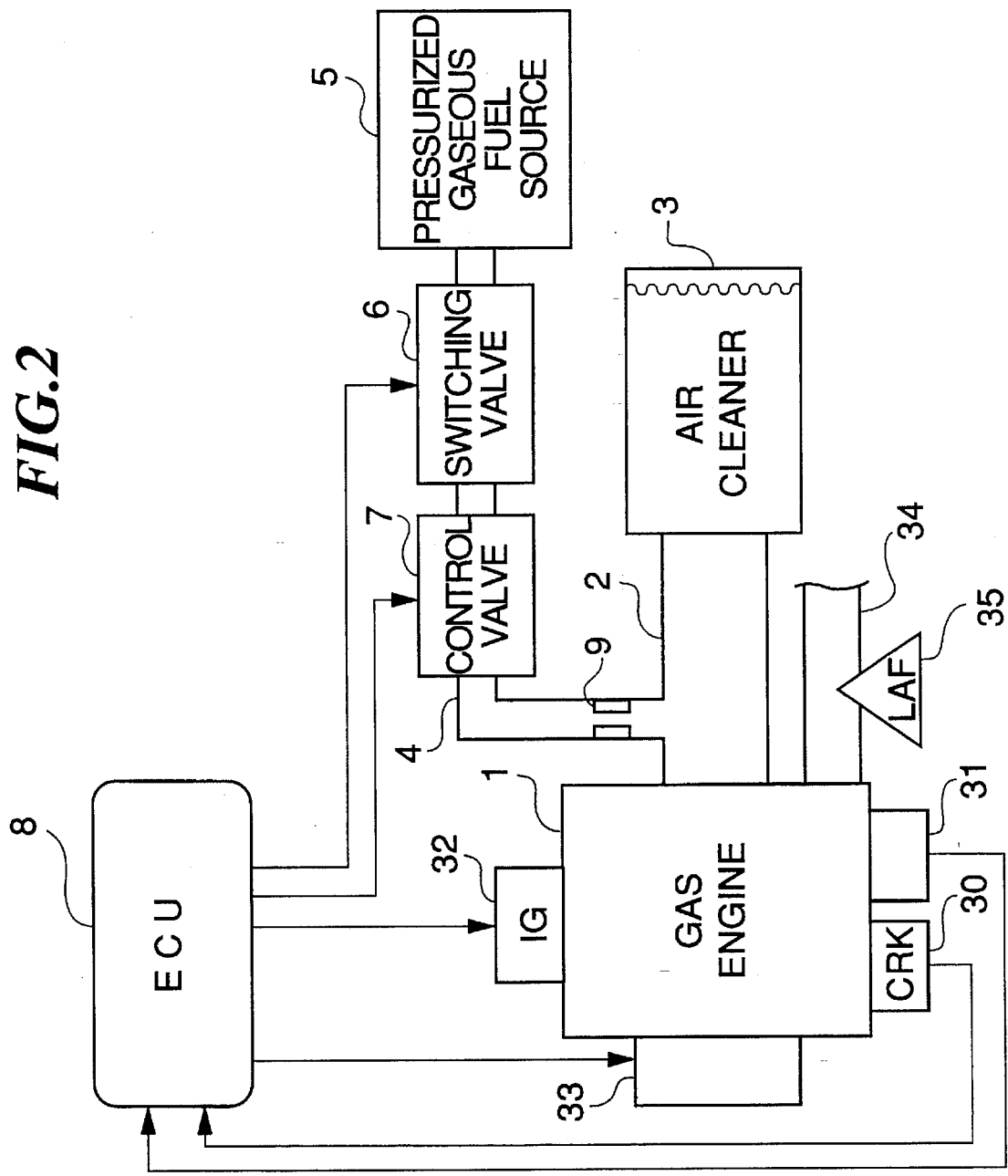
FIG. 2 is a schematic diagram showing the whole arrangement of a gas engine and a control system therefor, according to a first embodiment of the invention.

Referring first to FIG. 2, there is schematically illustrated the whole arrangement of a gas engine and a control system therefor, according to a first embodiment of the invention.

In the figure, reference numeral 1 designates a four-stroke cycle gas engine (hereinafter referred to as "the engine"). In an intake pipe 2 of the engine 1, there is arranged an air cleaner 3 at an end thereof, and a fuel supply pipe 4 branches off from the intake pipe 2 at a location between the air cleaner 3 and the engine 1.

Mounted at an end of the fuel supply pipe 4 is a pressurized gaseous fuel source 5 formed of a gas cylinder or the like, filled with a pressurized gaseous fuel such as LPG and LBG. A switching valve 6 and a control valve 7 are serially arranged across the fuel supply pipe 4 at locations downstream of the pressurized gas source 5. Further, a gas nozzle 9 in the form of a restriction is provided in the fuel supply pipe 4 at a location downstream of the control valve 7 and in the vicinity of a branching point of the fuel supply pipe 6 from the intake pipe 2. The switching valve 6 and control valve 7 are electrically connected to an electronic control unit (hereinafter referred to as "the ECU") 8 to have their operations controlled by signals from the ECU 8. The gas nozzle 9 is mounted in the fuel supply pipe 4 in a dismountable manner so as to be exchanged by another kind of gas nozzle according to the kind of a gaseous fuel to be used.

The switching valve 6 is formed by a normally closed electromagnetic valve and ON/OFF-controlled to be energized or deenergized by a command from the ECU 8. More specifically, when the engine 1 is in stoppage, the switching valve 6 is deenergized to be closed to inhibit the gaseous fuel from the pressurized gaseous fuel source 5 from being supplied to the engine 1, while it is energized to be opened to allow the gaseous fuel to be supplied to the engine 1.

The control valve 7 operates to control a flow rate Q of a gaseous fuel flowing in the fuel supply pipe 4 in response to a command from the ECU 8. More specifically, the control valve 7 controls the passage area of the gaseous fuel such that the flow rate Q is increased when the engine rotational speed NE falls below a predetermined engine rotational speed NEX (e.g. 2500 rpm) or when the engine 1 is brought into a fuel-lean state where the air-fuel ratio of an air-fuel mixture supplied to the engine 1 is lean, while it is decreased when the engine rotational speed NE exceeds the above predetermined engine rotational speed NEX or when the engine 1 brought into a fuel-rich state where the air-fuel ratio of the mixture is rich.

Figure 3:
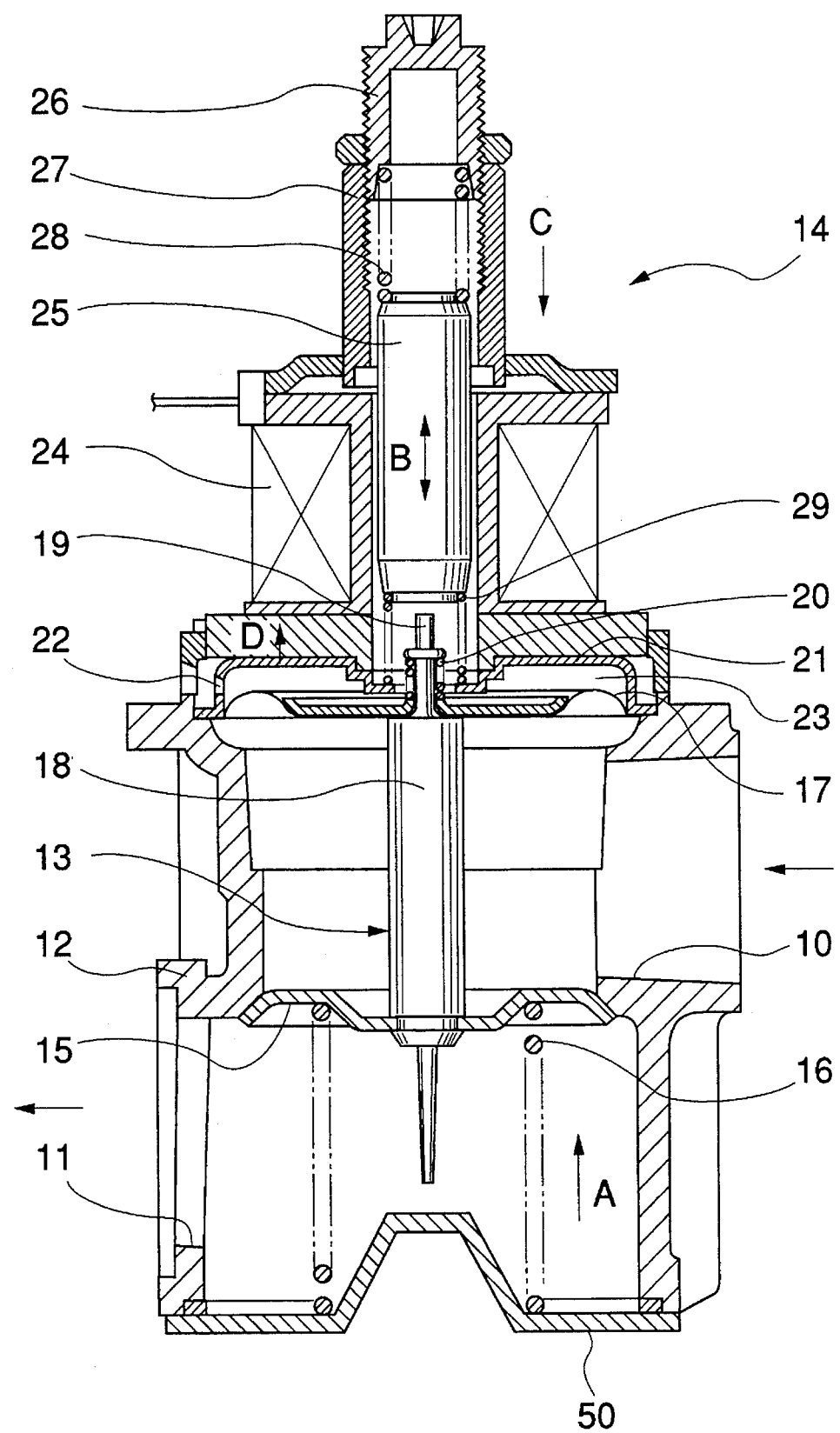
FIG. 3 is a longitudinal sectional view of a control valve (electromagnetic proportional valve) employed in the control system appearing in FIG. 2.

The control valve 7 is formed by an electromagnetic proportional valve as shown in FIG. 3, and controls the pressure of gaseous fuel to be supplied to the engine to a predetermined constant value dependent upon an amount of current applied to the control valve 7, without depending upon the pressure of the gaseous fuel supplied from the pressurized gaseous fuel source 5.

More specifically, the control valve 7 is comprised of a valve housing 12 having an inlet port 10, through which the gaseous fuel flows into the valve, and an outlet port 11, through which the gaseous fuel flows out of the valve, a valve section 13, and an energizing section 14 for controlling the operation of the valve section 13.

The valve section 13 is comprised of a valve element 15 formed of aluminum or the like, a valve spring 16 interposed between the valve element 15 and a valve bottom member 50, for urgingly biasing the valve element 15 in a direction indicated by an arrow A, a generally flat diaphragm 17 formed of NBR or the like, mounted in an upper portion of the valve housing 12, a stem 18 connecting between the diaphragm 17 and the valve element 15, a projection 19 having a generally T-shaped cross section, arranged at the top of the stem 18, a diaphragm-retaining spring 20 interposed between the projection 19 and the diaphragm 17 and urgingly biasing the diaphragm 17, and a diaphragm-retaining plate 21 retaining the diaphragm 17 in place in cooperation with the valve housing 12. A hole 22 is formed through a side wall of the diaphragm-retaining plate 21, for introducing atmospheric air into an atmospheric pressure chamber 23 defined between the diaphragm 17 and the diaphragm-retaining plate 21.

The energizing section 14 is comprised of an energizing coil 24, a plunger 25 disposed for movement in a direction indicated by an arrow B through a stroke according to an amount of current applied to the energizing coil 24, an adjusting screw 26 for adjusting the stroke of the plunger 25 within a predetermined allowable range, a top cover 27 screw-fitted on the adjusting screw 26, an upper plunger spring 28 interposed between the adjusting screw 26 and the plunger 25, for biasing the plunger 25 in a direction indicated by an arrow C, and a lower plunger spring 29 interposed between the plunger 25 and the diaphragm-retaining plate 21, for biasing the plunger 25 in a direction indicated by an arrow D.

According to the control valve 7 constructed as above, when the energizing coil 24 is energized, the plunger 25 is downwardly displaced by an attractive force caused by the energizing coil 24 according to the amount of current applied thereto, against the biasing force of the lower plunger spring 29, and accordingly the valve element 15 moves downward via the stem 18 to open the valve, whereby gaseous fuel flows from the inlet port 10 to the outlet port 11. In other words, the stroke of the plunger from its initial position varies according to the amount of applied current, and therefore the gaseous fuel flows out of the outlet port 11 at a flow rate linearly proportionate to the amount of the applied current. More specifically, the atmospheric pressure chamber 23 permanently communicates with the atmosphere via the hole 22 and accordingly has its inside pressure always maintained at the atmospheric pressure. Therefore, when the pressure of gaseous fuel flowing in through the inlet port 10 increases, the diaphragm 17 is upwardly displaced, and accordingly the valve element 15 connected to the diaphragm 17 via the stem 18 is also upwardly displaced, whereby the valve element 15 moves in the direction of closing the valve. On the other hand, when the pressure of gaseous fuel decreases, the diaphragm 17 is downwardly displaced, and accordingly the valve element 15 is also downwardly displaced, whereby the valve element 15 moves in the direction of opening the valve. In this way, the diaphragm 17 and the diaphragm-retaining plate 21 cooperatively form pressure-regulating means which controls the pressure of gaseous fuel flowing out of the control valve 7 to an almost constant value. By virtue of the above construction, the pressure of gaseous fuel to be supplied to the engine can be controlled to an almost constant value without employing a pressure regulator. As a result, the control system can dispense with a pressure regulator, leading to simplification and miniaturization of the system.

A crank angle (CRK) sensor 30 and an ignition pulser 31 are arranged in facing relation to a crankshaft, not shown, of the engine 1. The CRK sensor 30 generates a signal pulse (hereinafter referred to as "the CRK signal pulse") at a top dead center position of the engine, and supplies the CRK signal pulse to the ECU 8. The ignition pulser 31 generates ignition signal pulses at predetermined crank angles, and supplies the ignition signal pulses to the ECU 8.

An ignition device 32 is connected to the ECU 8 to have its ignition timing controlled by a command from the ECU 8. A starter motor 33 is drivingly connected to the engine 1 to start the same.

A linear output air-fuel ratio sensor (hereinafter referred to as "the LAF sensor") 35 is arranged in an exhaust pipe 34 of the engine 1, for detecting concentration of oxygen in exhaust gases from the engine and supplying an electric signal indicative of the sensed oxygen concentration to the ECU 8.

The ECU 8 is comprised of an input circuit having the functions of shaping the waveforms of input signals from various sensors such as ones mentioned above, shifting the voltage levels of sensor output signals to a predetermined level, converting analog signals from analog-output sensors to digital signals, and so forth, a central processing unit (hereinafter referred to as "the CPU"), memory means storing various operational programs which are executed by the CPU, and for storing results of calculations therefrom, and an output circuit which outputs driving signals to the switching valve 6, control valve 7, etc. Further, the ECU 8 calculates a time interval ME of generation of CRK signal pulses to calculate the engine rotational speed NE which is the reciprocal of the ME value.

The ECU 8 detects a crank angle speed of the engine 1 from the aforesaid CRK signal pulses, and determines the combustion state of the engine 1, based on a variation in the crank angle speed.

Figure 4:
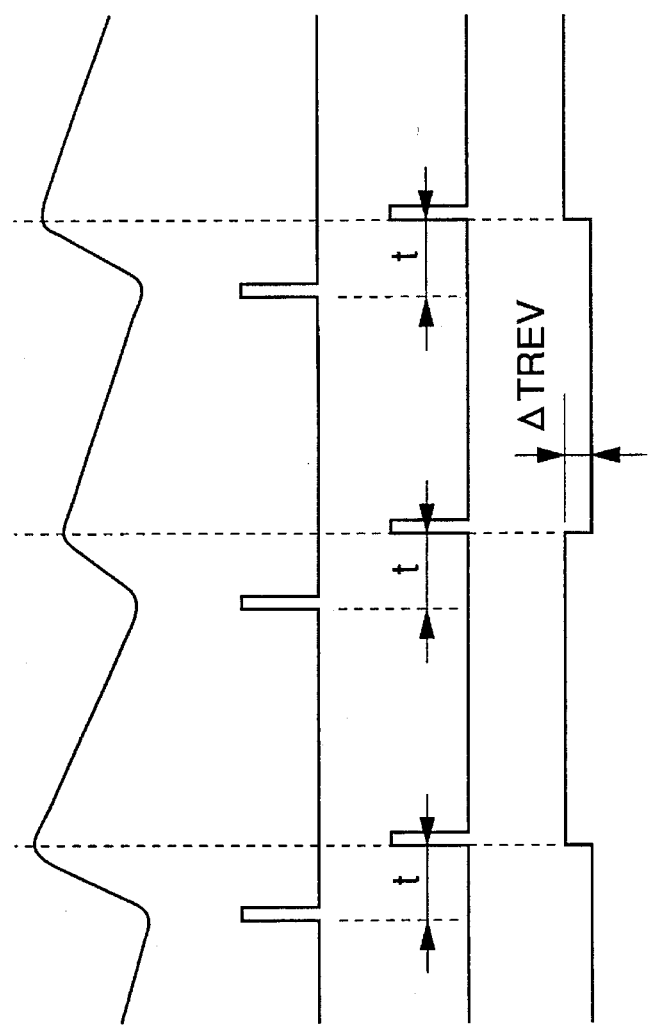
FIGS. 4A–4D are timing charts useful in explaining how to detect the combustion state of the gas engine appearing in FIG. 2.

More specifically, as shown in FIG. 4A, the momentary rotational speed of the engine 1, i.e. the momentary crank angle speed, drops to a lowest value at or in the vicinity of a crank angle position where an ignition signal pulse is generated, due to the compression resistance of the mixture supplied to the engine 1. Thereafter, the momentary crank angle speed rises due to acceleration of the crankshaft caused by an increase in the gas pressure at combustion. However, if the engine 1 undergoes irregular combustion, the crank angle speed falls below a value assumed at normal combustion. Therefore, when a predetermined time period t has elapsed from generation of an ignition signal pulse, at which the crank angle speed is assumed to reach almost the maximum value, the crank angle speed is sampled and held, and the difference $\Delta$TREV between the thus held values in adjacent cycles is calculated to determine the combustion state of the engine 1. That is, when the difference $\Delta$TREV is smaller than a predetermined reference value MFREF, it is determined that the engine 1 is in a normal combustion state, whereas if the difference $\Delta$TREV is larger than the predetermined reference value MFREF, it is determined that the engine 1 is in an irregular combustion state. Further, when the difference $\Delta$TREV is larger than a predetermined misfire determination value MFH, it is determined that the engine 1 undergoes misfiring.

The control system for the gas engine calculates an optimal ignition timing advance value $\theta$IGY, based on the engine rotational speed NE and the excess air ratio $\lambda$, and when the operating condition of the engine 1 enters a lean limit region, corrects the optimal ignition timing advance value $\theta$IGY to a retarded value, whereby the engine output is controlled by controlling the ignition timing, based on the thus corrected ignition timing advance value $\theta$IG.

Figure 1:
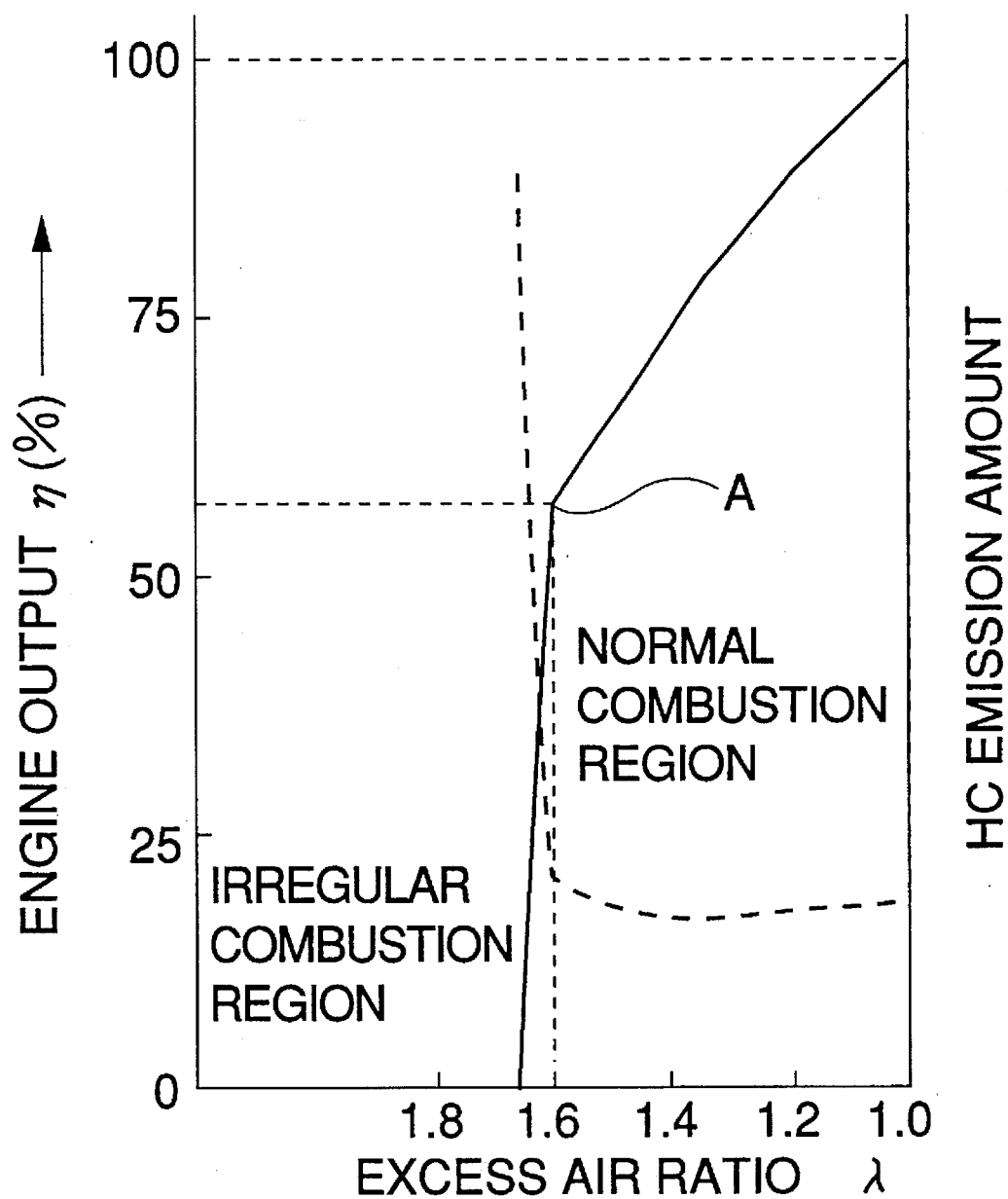
FIG. 1 is a graph showing the relationship between engine output η and an emission amount of HC, according to a conventional gas engine.

More specifically, as stated before, in a gas engine which employ a gaseous fuel such as LPG, the engine output can be controlled based only on the amount of the gaseous fuel when the excess air ratio $\lambda$ of the gas is smaller than approximately 1.6. However, when the excess air ratio A exceeds 1.6, the misfiring rate of the engine drastically increases, as shown in FIG. 1, resulting in fluctuations in the engine rotation and a sharp increase in the emission amount of unburnt gas components. That is, an increase in the misfiring rate causes a decrease in the engine output, and therefore the engine output cannot be stably controlled over a wide range of engine load from a no-load condition to a maximum engine output region, based only on the control of the gaseous fuel amount Q.

Figures 5, 7:
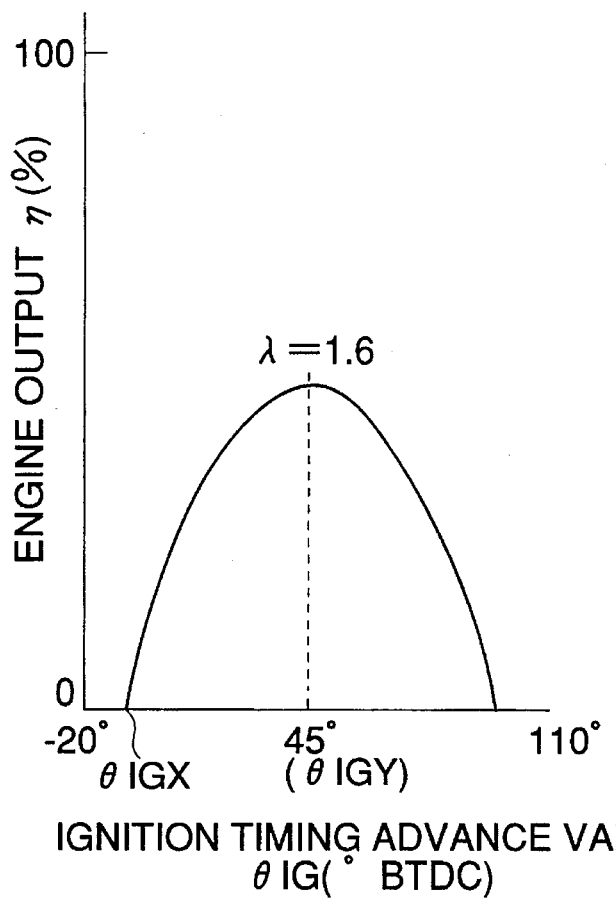
FIG. 5 is a graph showing the relationship between an ignition timing advance value θIG and the engine output η.
FIG. 7 shows n map which is used in determination of an optimal ignition timing advance value θIGY.

In this connection, the ignition timing advance value $\theta$IG and the engine output $\eta$ are in the relationship as shown in FIG. 5 (provided that $\lambda$=1.6). As is clear from the figure, the engine output $\eta$ can be depicted along such a parabolic curve that the $\eta$ value becomes the maximum when the ignition timing advance value $\theta$IG assumes the optimal ignition timing advance value $\theta$IGY (e.g. 45° BTDC), and moderately decreases as the $\theta$IG value shifts toward the advanced side or retarded side. Therefore, the engine output $\eta$ can be progressively lowered by retarding the $\theta$IG value to a suitable value ranging from the optimal ignition timing advance value $\theta$IGY (e.g. 45° BTDC) to a lower limit ignition timing advance value $\theta$IGX (e.g. −10° BTDC) at which the engine output $\eta$ becomes 0%. Thus, the engine output $\theta$ can be continuously and stably controlled from the no-load condition to the maximum power output region. The control operation executed by the ECU 8 will be now described hereinbelow.

Particularly, according to the invention, in view of the fact that the engine output (thermal efficiency) largely changes with a change in the ignition timing in a lean air-fuel ratio region where the excess air ratio $\lambda$ is larger than 1.6 for example, the ignition timing is retarded by a predetermined amount while the air-fuel ratio of the mixture is maintained unchanged, i.e. held at the lean limit value (e.g. $\lambda$=1.6) so as to progressively decrease the engine output, to thereby enlarge the engine output controllable range, i.e. the engine output range within which the engine output can be stably controlled.

Figure 6:
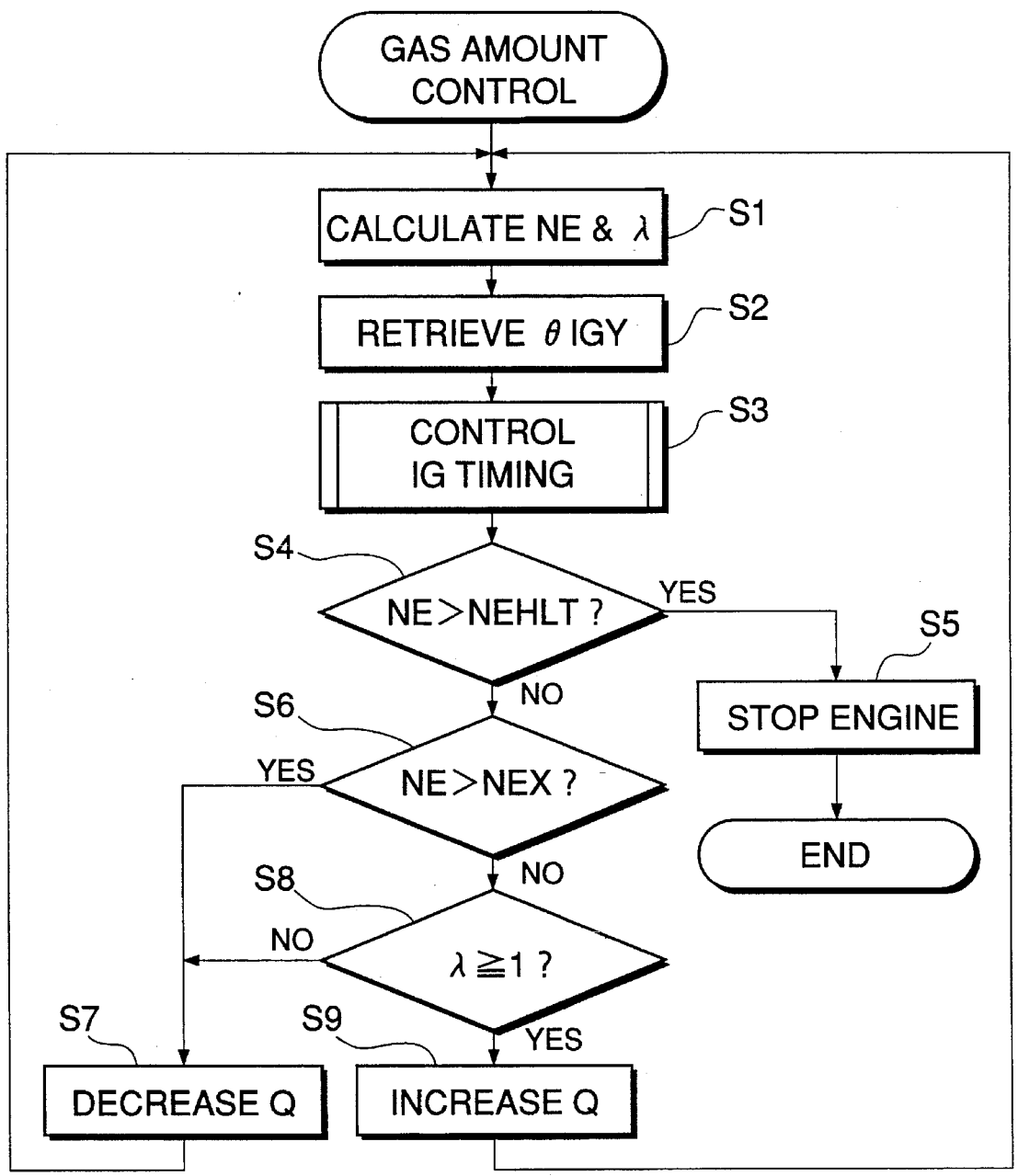
FIG. 6 is a flowchart showing a main routine for controlling a gaseous fuel amount.

FIG. 6 shows a main routine for controlling the gaseous fuel amount, which is triggered when a complete explosion state of the engine 1 is detected, e.g. when the engine rotational speed NE exceeds a cranking speed, e.g. 800 rpm during the starting operation the engine.

When the present program is started, the engine rotational speed NE (calculated from the output signal from the CRK sensor 29) and the excess air ratio $\lambda$ (calculated from the output signal from the LAF sensor 34) are read in at a step S1. Then, a $\theta$IGY map is retrieved to determine the optimal ignition timing advance value $\theta$IGY according to the engine rotational speed NE and excess air ratio $\lambda$, i.e. the operating condition of the engine, at a step S2.

The $\theta$IGY map is set, e.g. as shown in FIG. 7, such that map values $\theta$IGY (00, 00) to $\theta$IGY (16, 19) are provided in a manner corresponding to predetermined values NE00 to NE19 of the engine rotational speed NE and predetermined values $\lambda$00 to $\lambda$16 of the excess air ratio $\lambda$. The optimal ignition timing advance value $\theta$ IGY is determined based on the operating condition of the engine 1 by being read from the $\theta$IGY map.

At a step S3, the ignition timing control is carried out by executing an ignition timing control routine, described hereinafter, and at a step S4, it is determined whether or not the engine rotational speed NE is higher than a higher limit value NEHLT (e.g. 4000 rpm) which is the maximum allowable rotational speed. If the engine rotational speed NE exceeds the higher limit value NEHLT, the engine 1 is stopped at a step S5, followed by terminating the present program.

On the other hand, if the answer to the question of the step S4 is negative (NO), i.e. if the engine rotational speed NE is lower than the higher limit value NEHLT, the program proceeds to a step S6, wherein it is determined whether or not the engine rotational speed NE is higher than a predetermined rotational speed NEX (e.g. 2500 rpm) which is lower than the higher limit value NEHLT. If the answer is affirmative (YES), the valve opening of the control valve 7 is made smaller to reduce the gaseous fuel amount Q such that the air-fuel ratio of the mixture becomes leaner at a step S7, followed by the program returning to the step S1.

If the answer to the question of the step S6 is negative (NO), i.e. if the engine rotational speed NE is lower than the predetermined rotational speed NEX, the program proceeds to a step S8, wherein it is determined whether or not the excess air ratio λ is equal to or larger than 1, which means that the air-fuel ratio of the mixture has reached a stoichiometric value or leaner than the same. If the answer is negative (NO), i.e. if the air-fuel ratio of the mixture is richer than the stoichiometric value, the gaseous fuel amount Q is decreased to control the air-fuel ratio of the mixture in the mixture-leaning direction, at the step S7, followed by the program returning to the step S1. In the present embodiment, the threshold value of the excess air ratio λ is set to 1, as stated above, because a satisfactory combustion state can be obtained when the air-fuel ratio is controlled to the stoichiometric value since the fuel is in a gaseous phase, and therefore the air-fuel ratio of the mixture need not be further enriched.

On the other hand, if the answer at the step S8 is affirmative (YES), i.e. if the air-fuel ratio of the mixture is not richer than the stoichiometric value, the gaseous fuel amount Q is increased to shift the air-fuel ratio of the mixture in the mixture-enriching direction, at a step S9, followed by the program returning to the step S1.

Figure 8:
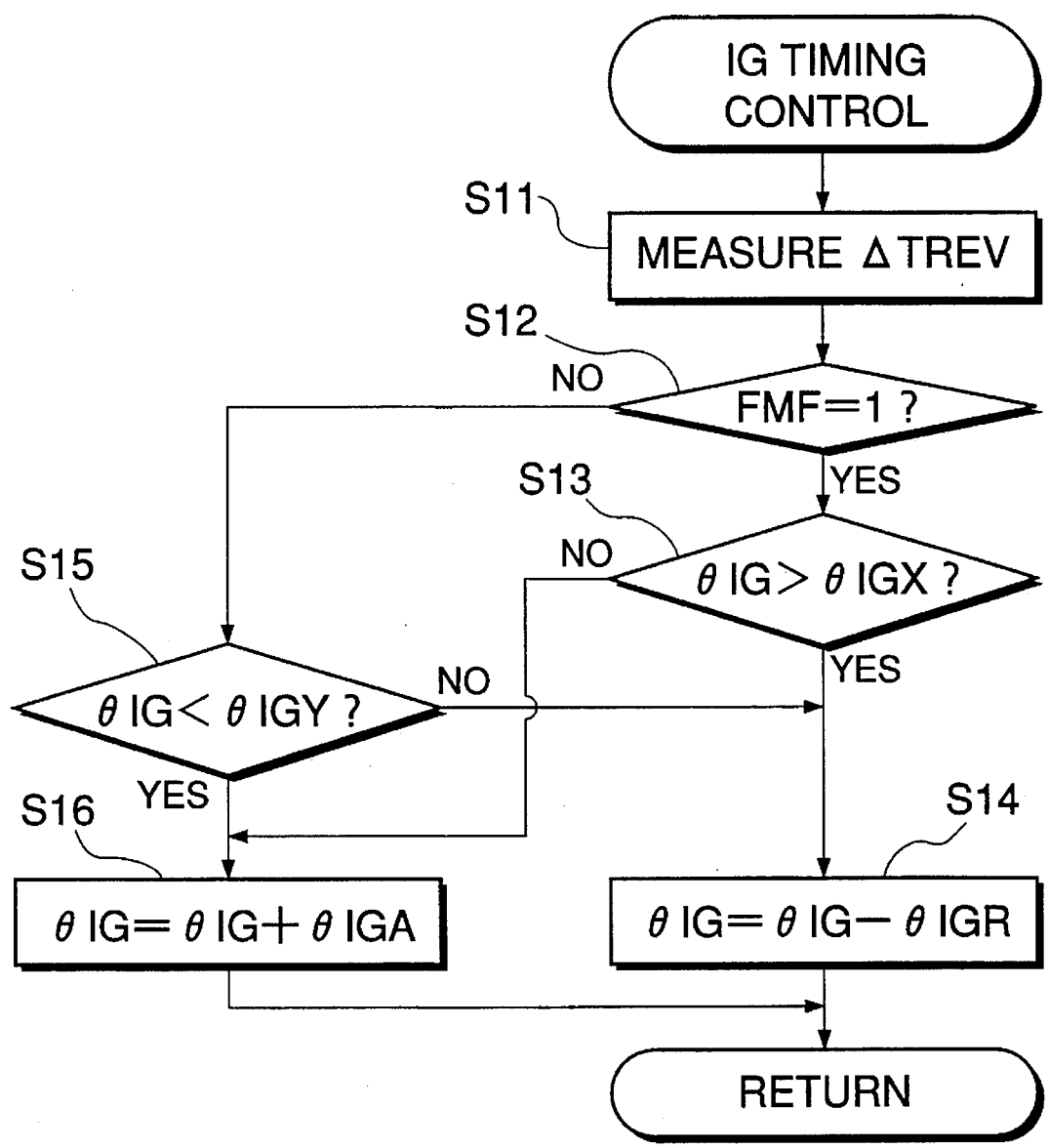
FIG. 8 is a flowchart showing a subroutine for controlling ignition timing of the engine, which is executed by the FIG. 6 routine.

FIG. 8 shows details of the routine for carrying out the ignition timing control which is executed at the step S3 in FIG. 6.

First, at a step, S11, the variation ΔTREV in the rotational speed of the crankshaft is measured, and it is determined at a step S12 whether or not a flag FMF is set to "1". The flag FMF is set by a routine, not shown, such that it is set to "0" when the variation Δ TREV is below the predetermined reference value MFREF, which means that the engine 1 does not undergo irregular combustion, whereas it is set to "1" when the variation ΔTREV exceeds the predetermined reference value MFREF, which means that the engine 1 undergoes irregular combustion. Thus, at the step S12, a determination as to whether or not the engine 1 undergoes irregular combustion is made based on the variation ΔTREV. If it is determined that the flag FMF is set to "1" indicating that the engine 1 undergoes irregular combustion, it is judged that the air-fuel ratio of the mixture is equal to or leaner than the lean limit value, and then the program proceeds to a step S13.

At the step S13, it is determined whether or not a present value of the ignition timing advance value θIG is larger than the lower limit value θIGX (e.g. −10° TDC). If the answer is affirmative (YES), the ignition timing advance value θIG is decreased by a predetermined angle θIGR (e.g. 1°) to calculate a new value of the ignition timing advance value θIG to retard the ignition timing at a step S14, followed by the program returning to the main routine of FIG. 6.

If the answer to the question of the step S13 is negative (NO), i.e. if the ignition timing advance value θIG is below the lower limit value θIGX, the ignition timing advance value θIG is increased by a predetermined angle θIGA (e.g. 1°) to calculate a new value of the ignition timing advance value θIG to advance the ignition timing at a step S16, followed by the program returning to the main routine of FIG. 6.

On the other hand, if the answer to the question of the step S12 is negative (NO), i.e. if the engine 1 does not undergo irregular combustion, the program proceeds to a step S15, wherein it is determined whether or not the present value of the ignition timing advance value θIG is smaller than the optimal ignition timing advance value θIGY (e.g. 45°BTDC). If the answer is affirmative (YES), the ignition timing advance value θIG is increased by the predetermined angle θIGA (e.g. 1°) to calculate a new value of the ignition timing advance value θIG to advance the ignition timing at a step S16, followed by the program returning to the main routine of FIG. 6.

If the answer to the question of the step S15 is negative (NO), the program proceeds to the step S14 to decrease the ignition timing advance value θIG by the predetermined angle θIGR (e.g. 1°) to calculate a new value of the ignition timing advance value θIG to retard the ignition timing, followed by the program returning to the main routine of FIG. 6.

In the above described way, according to the present embodiment, when the engine 1 is operating in a region where no irregular combustion takes place, the ignition timing control is carried out so as to bring the ignition timing advance value θIG to the optimal ignition timing advance value θIGY, and at the same time the gaseous fuel amount Q is controlled according to operating conditions of the engine. In short, the engine output is controlled substantially through the air-fuel ratio control alone.

On the other hand, when the air-fuel ratio becomes equal to or leaner than the lean limit value at which the engine 1 can undergo irregular combustion, the engine output is controlled by retarding the ignition timing while supplying the engine with an almost constant amount of gaseous fuel to maintain the air-fuel ratio of the mixture at the lean limit value (e.g. λ=1.6). More specifically, according to the present embodiment, even if the air-fuel ratio reaches the lean limit value at which the engine 1 can undergo irregular combustion, gaseous fuel is supplied at a nearly constant rate to the engine 1. By virtue of the supply of the nearly constant fuel amount, when the air-fuel ratio of the mixture becomes richer with a decrease in the engine rotational speed, the engine rotational speed increases. Conversely, when the air-fuel ratio of the mixture becomes leaner with an increase in the engine rotational speed, the engine rotational speed decreases. Thus, the engine rotational speed is maintained steady, making it possible to stabilize the engine rotational speed even when the engine output is controlled so as to eliminate irregular combustion.

In this way, while in the conventional gas engine in which the intake air amount is controlled by a throttle valve arranged in the intake system, irregular combustion can occur to cause unsteady engine rotational speed and engine stalling, according to the present invention, the supply of a nearly constant amount Q of gaseous fuel to the engine can make the engine rotational speed steady even with the air-fuel ratio being held at the lean limit value. Therefore, the engine output can be continuously and stably controlled even in a low output region by correcting the ignition timing advance value θIG to the retarded side while maintaining the engine rotational speed in a steady condition.

Figure 9:
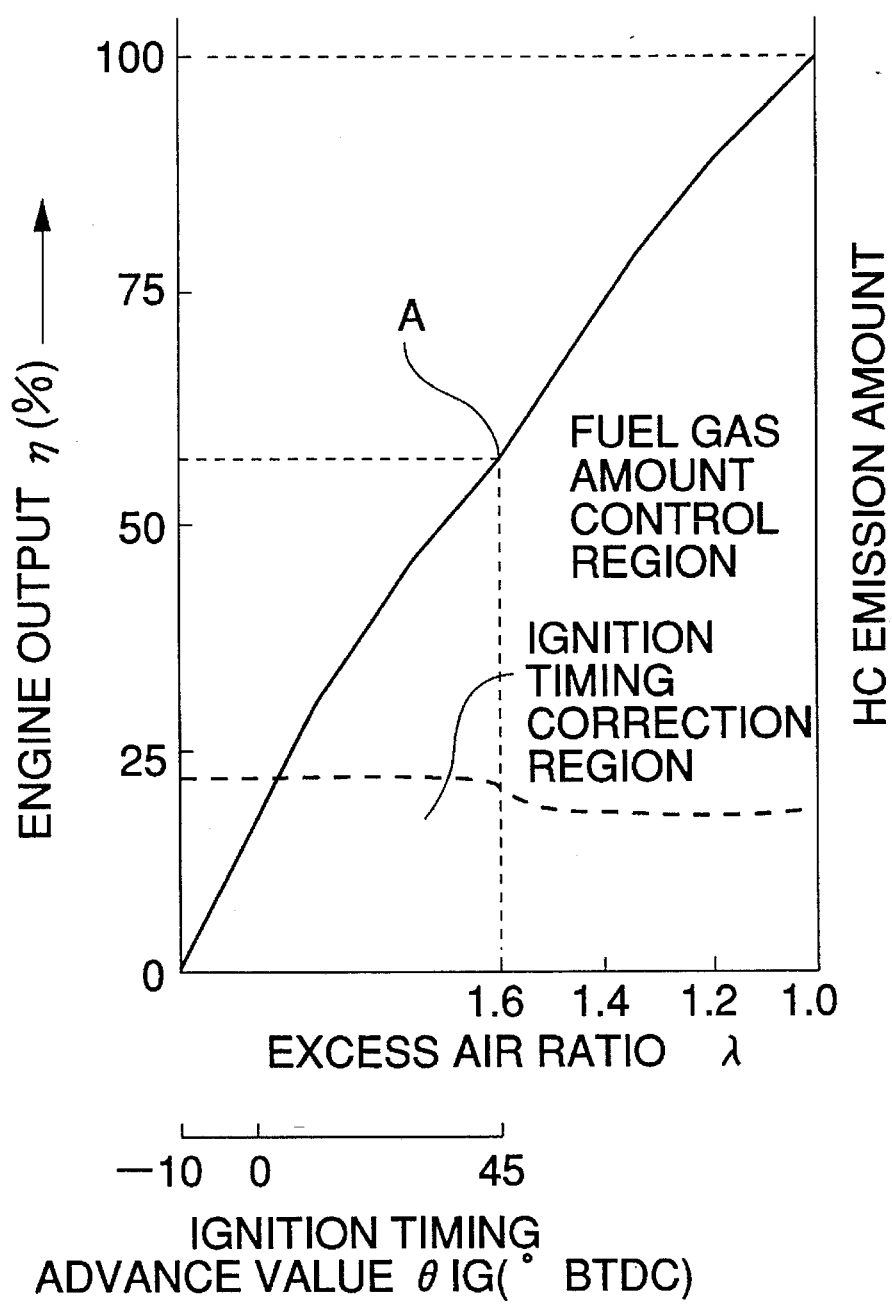
FIG. 9 is a graph showing the relationship between an excess air ratio λ and the ignition timing advance value θIG, and the engine output η, as well as the relationship between the excess air ratio λ and the ignition timing advance value θIG, and the emission amount of HC.

FIG. 9 shows the relationship between the excess air ratio λ and the ignition timing advance value θIG, and the engine output η, as well as the relationship between the excess air ratio λ and the ignition timing advance value θIG, and the emission amount of HC.

As is learned from the figure, before the air-fuel ratio (excess air ratio λ) reaches the lean limit value (excess air ratio λ=1.6) as indicated by a point A, the engine output is controlled through the air-fuel ratio control carried out by controlling the flow rate of gaseous fuel while the ignition timing is controlled to the optimal ignition timing advance value θIGY. On the other hand, after the air-fuel ratio reaches the lean limit Value, the ignition timing is corrected to the advanced or retarded side, to thereby control the engine output even in a low output region with the engine rotational speed maintained in a steady state. In this way, the engine output controllable range can be enlarged from a no-load region to a maximum power output region. In addition, even when the engine output is thus controlled, combustion of fuel takes place without any hindrance, thereby enabling prevention of a drastic increase in the emission amount of HC in the low output region, as indicated by the broken line in FIG. 8.

As described above, according to the control system of the invention, when the engine is in a normal operating condition, the engine output can be controlled by varying the gaseous fuel amount Q. On the other hand, when the air-fuel ratio of the mixture becomes equal to or leaner than the lean limit value, the ignition timing is retarded by the predetermined angle, to thereby progressively decrease the engine output while the air-fuel ratio is maintained at the lean limit value (e.g. $\lambda=1.6$). Thus, the engine output can be stably controlled even in the low output region without occurrence of irregular combustion while the engine rotational speed NE is feedback-controlled to a preset value to maintain almost constant speed operation of the engine. Therefore, the engine output can be stably controlled over a wide range of engine load from a no-load region to a maximum engine output region. Besides, so long as the air-fuel ratio remains the same, the retarded ignition timing contributes to reduction in the emission amount of NOx, whereby low NOx operation of the engine can be achieved in a low load operating region.

Further, in the present embodiment, the above control is carried out by the control valve (electromagnetic proportional valve) 7 which has the function of regulating the pressure of gaseous fuel, and therefore the gaseous fuel pressure to be supplied to the engine need not be regulated by an independent pressure regulator such as a zero governor, dispensing with the use of the pressure regulator, leading to simplification and miniaturization of the system. Besides, in the present embodiment, the gas nozzle 9 is provided in a dismountable manner, so that even when the kind of gaseous fuel to be used is changed, only the gas nozzle 9 has to be exchanged by another one which conforms to the new kind of the gaseous fuel, making it possible to apply the above described control to various kinds of gaseous fuel.

Next, description will be made of a control system according to a Second embodiment of the invention.

Figure 10:
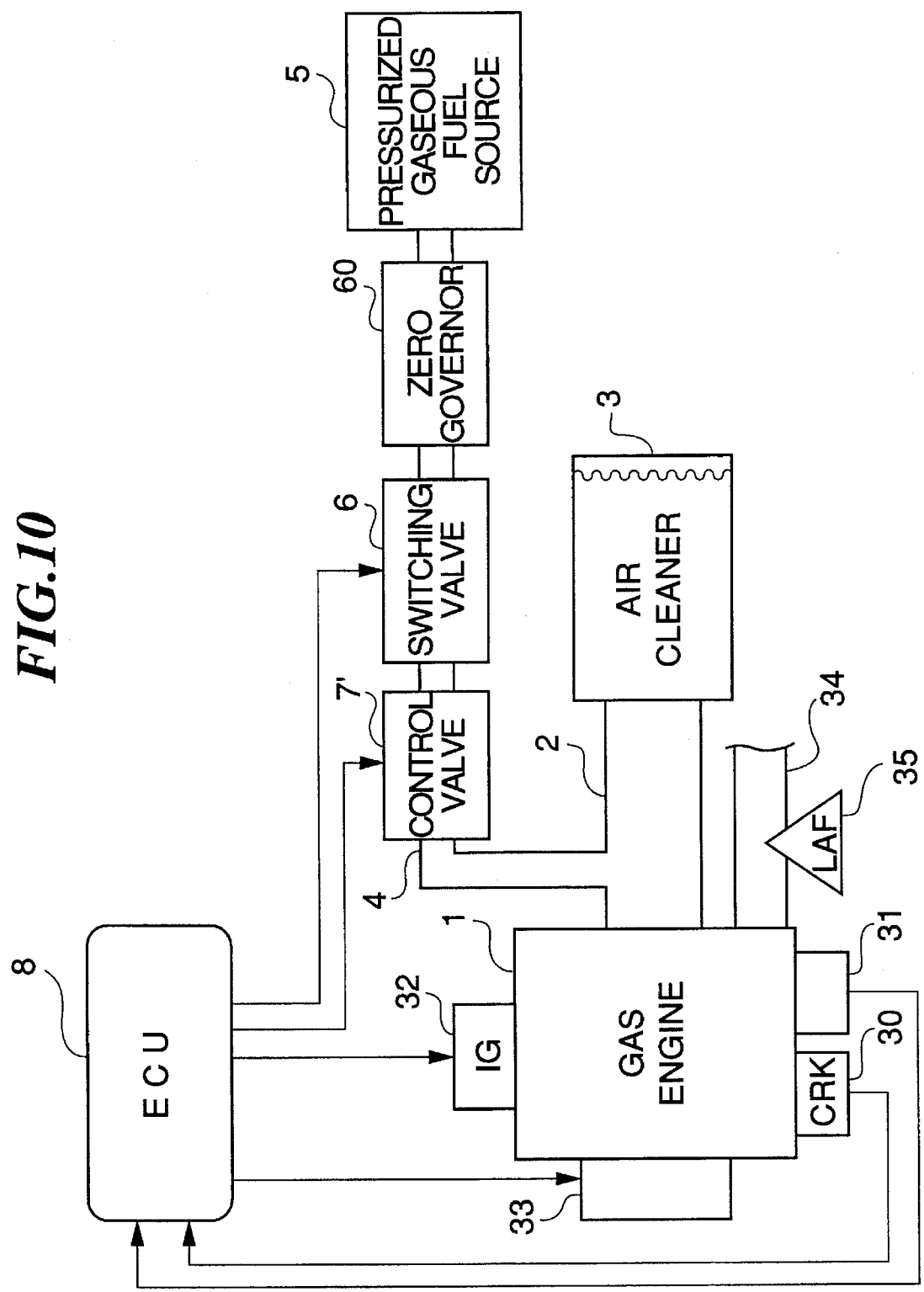
FIG. 10 is a schematic diagram showing the whole arrangement of a gas engine and a control system therefor, according to a second embodiment of the invention.

FIG. 10 schematically shows the whole arrangement of a gas engine and a control system therefor, according to a second embodiment of the invention. The second embodiment is distinguished from the first embodiment described above, only in that a zero governor 60 as a pressure regulator is arranged across the fuel supply pipe 4 at a location downstream of the pressurized gas source 5 and upstream of the switching valve 6 identical with the one in FIG. 2, the gas nozzle 10 in FIG. 2 is omitted, and a control valve 7' has a variable opening nozzle, not shown, incorporated therein, the opening area of which is controlled to vary with the engine rotational speed NE and the excess air ratio λ. Except for these, the system according to the second embodiment is identical in construction and arrangement with the first embodiment. Therefore, in FIG. 10, elements and parts corresponding to those in the first embodiment are designated by identical reference numerals, description thereof being omitted.

The zero governor 60 regulates the pressure of gaseous fuel to a predetermined constant value which is slightly higher than the atmospheric pressure, and the gaseous fuel with the pressure thus regulated is drawn into the engine 1 through the switching valve 6, the control valve 7' and the intake pipe 2.

According to the present embodiment, similarly to the first embodiment, by executing the gaseous fuel amount control shown in FIG. 6 and the ignition timing control shown in FIG. 8, the engine output can be stably controlled even in a low output region through a nearly constant speed operation of the engine where the engine rotational speed is feedback-controlled to a preset value while avoiding irregular combustion in the low output range. That is, the engine output can be stably controlled over a wide range of engine load from a no-load region to a maximum engine output region.

The present invention is not limited to the above described embodiments but various modifications thereof may be possible. For example, in the above embodiments, the excess air ratio λ is calculated by detecting the concentration of oxygen by means of the LAF sensor 16. However, since the intake air amount is not controlled by a throttle valve, it is almost constant. Therefore, the excess air ratio λ may be estimated from the gaseous fuel amount Q and the engine rotational speed NE, and hence the LAF sensor 16 may be omitted.

In addition, the ignition timing is corrected to the advanced or retarded side at the step S12, depending on the presence/absence of irregular combustion. However, whether the air-fuel ratio of the mixture is equal to or leaner than the lean limit value of the air-fuel ratio may be estimated from the excess air ratio λ, and further the ignition timing may be largely retarded when the air-fuel ratio assumes a value immediately before the lean limit value. That is, the ignition timing may be determined by the use of an ignition timing map similar to the one shown in FIG. 5, in place of carrying out the determination as to irregular combustion and the advancement and retardation control of the ignition timing.

What is claimed is:

1. In a control system for an internal combustion engine having a pressurized gaseous fuel source, a control valve for regulating an amount of gaseous fuel supplied from said pressurized gaseous fuel source, and an intake passage in which said gaseous fuel, the amount of which has been regulated by said control valve, is mixed with intake air and supplied to said engine as an air fuel mixture, said engine being a throttleless type in which an output of said engine is controlled solely by controlling a flow rate of said gaseous fuel supplied to said engine without controlling an amount of intake air supplied to said engine, the improvement comprising:

air-fuel ratio control means for controlling an air-fuel ratio of said air-fuel mixture to be supplied to said engine by regulating the amount of said gaseous fuel through said control valve;

operating condition-detecting means for detecting operating conditions of said engine;

ignition timing-calculating means for calculating an optimum value of ignition timing of said engine, based on said operating conditions detected by said operating condition-detecting means; and ignition timing-correcting means for decreasing the output of said engine by retarding the ignition timing of said engine when the air-fuel ratio of said air-fuel mixture is in a predetermined lean limit region, while controlling the ignition timing of said engine to said optimum value calculated by said ignition timing-calculating means before the air-fuel ratio of said air-fuel mixture reaches said predetermined lean limit region.

2. A control system as claimed in claim 1, including rotational speed-detecting means forming part of said operating condition-detecting means, for detecting rotational speed of said engine, combustion state-determining means for determining a combustion state of said engine, based on a variation in the rotational speed of said engine detected by said rotational speed-detecting means, and lean limit region-determining means for determining whether or not the air-fuel ratio of said air-fuel mixture is in said predetermined lean limit region, based on said combustion state determined by said combustion state-determining means.

3. In a control system for an internal combustion engine having a pressurized gaseous fuel source, a fuel supply passage connected to said pressurized gaseous fuel source, a control valve arranged across said fuel supply passage, for regulating an amount of gaseous fuel supplied from said pressurized gaseous fuel source, and an intake passage in which said gaseous fuel, the amount of which has been regulated by said control valve, is mixed with intake air and supplied to said engine as an air-fuel mixture, the improvement comprising:

a gas nozzle provided in said fuel supply passage at a location downstream of said control valve in a dismountable manner, for injecting gaseous fuel into said intake passage, said control valve comprising an electromagnetic proportional valve capable of controlling pressure of said gaseous fuel to be supplied to said engine dependent on an amount of current applied thereto, without depending on the pressure of said gaseous fuel supplied from said pressurized gaseous fuel source.

4. A control system as claimed in claim 3, wherein said electromagnetic proportional valve comprises a valve section for regulating an amount of gaseous fuel flowing through said electromagnetic proportional valve, a valve housing in which said valve section is accommodated, energizing means arranged adjacent said valve housing and operatively connected to said valve section, for controlling operation of said valve section, and pressure-regulating means provided in said valve section for regulating the pressure of said gaseous fuel to be supplied to said engine, based on pressure of said gaseous fuel flowing through said electromagnetic proportional valve.

5. A control system as claimed in claim 3, wherein said engine is a throttleless type in which an output of said engine is controlled solely by controlling a flow rate of gaseous fuel supplied to said engine without controlling an amount of intake air supplied to said engine, the control system including:

air-fuel ratio control means for controlling an air-fuel ratio of said air-fuel mixture to be supplied to said engine by regulating the amount of Said gaseous fuel flowing through said control valve;

operating condition-detecting means for detecting operating conditions of said engine;

ignition timing-calculating means for calculating an optimum value of ignition timing of said engine, based on said operating conditions detected by said operating condition-detecting means; and ignition timing-correcting means for decreasing the output of said engine by retarding the ignition timing of said engine when the air-fuel ratio of said air-fuel mixture is in a predetermined lean limit region, while controlling the ignition timing of said engine to said optimum value calculated by said ignition timing calculating means before the air-fuel ratio of said air-fuel mixture reaches said predetermined lean limit region.

6. A control system as claimed in claim 5, including rotational speed-detecting means forming part of said operating condition-detecting means, for detecting rotational speed of said engine, combustion state-determining means for determining a combustion state of said engine, based on a variation in the rotational speed of said engine detected by said rotational speed-detecting means, and lean limit region-determining means for determining whether or not the air-fuel ratio of said air-fuel mixture is in said predetermined lean limit region, based on said combustion state determined by said combustion state-determining means.

* * * * *